US007630311B2

(12) United States Patent
Jung et al.

(10) Patent No.: US 7,630,311 B2
(45) Date of Patent: Dec. 8, 2009

(54) LOCATION MANAGEMENT SERVER AND ETHERNET-BASED WIRELESS LAN DISTRIBUTION SYSTEM HAVING LOCAL MANAGEMENT SERVER, AND EMBODIMENT METHOD THEREOF

(75) Inventors: Hee-Young Jung, Daejeon (KR); Jae-Hong Min, Daejeon (KR); Ki-Shik Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1016 days.

(21) Appl. No.: 10/420,082

(22) Filed: Apr. 22, 2003

(65) Prior Publication Data

US 2004/0105449 A1   Jun. 3, 2004

(30) Foreign Application Priority Data

Dec. 2, 2002   (KR) ............... 10-2002-0075919

(51) Int. Cl.
*H04J 1/16* (2006.01)
(52) U.S. Cl. .................. 370/235; 370/338; 370/392
(58) Field of Classification Search ........... 370/229, 370/235, 236, 230, 230.1, 395.71–395.72, 370/400–401, 352, 353, 354, 355, 356, 331, 370/389, 392, 393, 399; 455/439, 436, 525
See application file for complete search history.

(56) References Cited

U.S. PATENT DOCUMENTS

| | | | |
|---|---|---|---|
| 4,799,215 A * | 1/1989 | Suzuki | ............... 370/227 |
| 5,768,531 A | 6/1998 | Lin | |
| 5,822,361 A | 10/1998 | Nakamura et al. | |
| 5,875,185 A | 2/1999 | Wang et al. | |
| 6,272,129 B1 | 8/2001 | Dynarski et al. | |
| 6,434,165 B1 * | 8/2002 | Sherer et al. | ............... 370/465 |

(Continued)

FOREIGN PATENT DOCUMENTS

JP   2001-045050   2/2001

(Continued)

OTHER PUBLICATIONS

Leon-Garcia, Widjaja, Indra, Communication networks : fundamental concepts and key architectures, 2000, McGraw-Hill International Editions, pp. 419-420-421.*

(Continued)

*Primary Examiner*—William Trost, IV
*Assistant Examiner*—Raj Jain
(74) *Attorney, Agent, or Firm*—Blakely, Sokoloff, Taylor & Zafman LLP

(57) ABSTRACT

A wireless LAN distribution system, forwarding data received from a correspondent node to a station connected to an access point, includes: a location management server (LMS) for storing and managing a mapping table as an information table storing IP addresses of stations and physical access control addresses of the access points having the stations located therein, and causing the access points to perform an IP address check for the stations located in their area; an edge router for forwarding the data to the LMS using the physical access control address of the mapping table; and an access point for checking the physical access control address of the access point and the IP address of the destination station, and forwarding the data from the correspondent node.

14 Claims, 10 Drawing Sheets

U.S. PATENT DOCUMENTS

| | | | | |
|---|---|---|---|---|
| 6,701,361 | B1* | 3/2004 | Meier | 709/224 |
| 6,940,836 | B2* | 9/2005 | Borella et al. | 370/331 |
| 6,990,101 | B1* | 1/2006 | Chow et al. | 370/392 |
| 7,016,377 | B1* | 3/2006 | Chun et al. | 370/493 |
| 2001/0031634 | A1* | 10/2001 | Mizutani et al. | 455/425 |
| 2002/0029326 | A1* | 3/2002 | Reuter et al. | 711/206 |
| 2002/0089927 | A1* | 7/2002 | Fischer et al. | 370/229 |
| 2003/0123392 | A1* | 7/2003 | Ruutu et al. | 370/235 |
| 2004/0017292 | A1* | 1/2004 | Reese et al. | 340/539.1 |
| 2004/0100973 | A1* | 5/2004 | Prasad | 370/401 |

FOREIGN PATENT DOCUMENTS

| | | |
|---|---|---|
| KR | 1020010044253 | 1/2001 |

OTHER PUBLICATIONS

Ei-Hoiydi, Amre, "Immplementation Options for the Distribution System in the 802.11 Wireless LAN Infrastructure Network", 2000 IEEE, pp. 164-169.*

Ei-Hoiydi, Amre, "Immplementation Options for the Distribution System in the 802.11 Wireless LAN Infrastructure Network", 2000 IEEE, pp. 164-169.*

El-Hoiydi, Amre, "Immplementation Options for the Distribution System in the 802.11 Wireless LAN Infrastructure Network", 2000 IEEE, pp. 164-169.

Kuo, W.K., "Time Bounded Services and Mobility Management in IEEE 802.11 Wireless WANs", 1997 IEEE, pp. 157-161.

Jost Weinmiller, "Grouping Wireless Picocells with a Distribution System" In Proc. of MoMuC'97.

* cited by examiner

FIG.5

| Order | Information |
|---|---|
| 1 | Capability Info. |
| 2 | Listen interval |
| 3 | Current AP address |
| 4 | SSID |
| 5 | IP address |

(a)

| Order | Information |
|---|---|
| 1 | Capability Info. |
| 2 | Listen interval |
| 3 | Current AP address |
| 4 | SSID |
| 5 | Supported rates |
| 6 | IP address |

| MAC address of APs | IP address of STAs |
|---|---|
| MAC_Addr_AP_1 | IP_Addr_STA_11<br>IP_Addr_STA_12<br>–<br>–<br>–<br>IP_Addr_STA_1a |
| MAC_Addr_AP_2 | IP_Addr_STA_21<br>IP_Addr_STA_22<br>–<br>–<br>–<br>IP_Addr_STA_2b |
| –<br>–<br>– | –<br>–<br>– |
| MAC_Addr_AP_k | IP_Addr_STA_k1<br>IP_Addr_STA_k2<br>–<br>–<br>–<br>IP_Addr_STA_kc |

LOCATION MANAGEMENT SERVER AND ETHERNET-BASED WIRELESS LAN DISTRIBUTION SYSTEM HAVING LOCAL MANAGEMENT SERVER, AND EMBODIMENT METHOD THEREOF

BACKGROUND OF THE INVENTION (a) Field of the Invention

The present invention relates to a wireless LAN (Local Area Network) distribution system and an embodiment method thereof. More specifically, the present invention relates to a location management server, an Ethernet-based LAN distribution system comprising the local management server, and an embodiment method thereof.

(b) Description of the Related Art

Wireless LAN, initially developed just as an alternative to a wire LAN, is now being taken into consideration as an important wireless Internet access means, with the advent of the IEEE 802.11b standard that supports a data transmission rate of up to 11 Mbps at 2.4 GHz.

In addition, development has occurred for the conventional wireless Internet for mobile communication networks, but difficulties exist in extending services due to its low data transmission rate and high price for use. Contrarily, wireless LAN using an unlicensed band, ISM (Industrial Scientific and Medical), and relatively inexpensive equipment supports a high data transmission rate with a low price for use. Hence, the wireless LAN has recently become an important means for wireless Internet centering around a hot spot area due to those strong points.

In the wireless LAN, a station (hereinafter referred to as "STA") having a wireless interface is connected to a wire network through an access point (hereinafter referred to as "AP") having the same wireless interface as a second STA.

For multiple APs present in one sub-net, they are connected through a wireless LAN distribution system (hereinafter referred to as "DS"). Namely, connections between APs and between an AP and other networks are through the DS.

In the IEEE 802.11 standard, which has been widely used in recent years, however, the DS is defined but the details of its embodiment are not prescribed. In actuality, the embodiment of the DS relies on the individual manufacturers' standards.

Although they differ depending on the capability of the APs, the currently used methods include a method in which all the APs on the DS perform an address resolution protocol (hereinafter referred to as "ARP") function, and a method in which an edge router performs an ARP and each AP performs a proxy ARP on behalf of STAs, or each STA directly sends an ARP response.

FIG. 1 illustrates an example of a representative Ethernet-based wireless LAN distribution system comprised of four APs.

The DS includes, as shown in FIG. 1, a plurality of APs 105-1 to 105-m connected to an IEEE 802.3 Ethernet 104, as is now most widely used.

More specifically, the DS comprises a correspondent node (hereinafter referred to as "CN") 101 connected to an Internet network 102 for sending data to an STA 106, a public or private Internet network 102, an edge router 103 responsible for a subnet comprised of APs 105-1 to 105-m, a wireless LAN distribution system 104 operated according to the IEEE 802.3 standard, m APs 105-1 to 105-m each connected to the same wireless LAN distribution system 104, and an STA 106 receiving the data in the end.

The data-forwarding process of the above construction will now be described. The data sent from the CN 101 to the destination STA 106 are first forwarded to the edge router 103, to which the destination STA 106 belongs, via the Internet network 102 using Internet protocol (hereinafter referred to as "IP") routing. The edge router 103 simply broadcasts the received data to the wireless LAN distribution system 104. Then the individual APs check a destination IP address for the broadcast data, perform an ARP to search for a destination media access control (hereinafter referred to as "MAC"), and finally send the data to the STA 106.

FIG. 2 is a timing diagram of the conventional Ethernet-based wireless LAN distribution system for association and data reception, in which the steps S201 and S202 involve association, and the steps S203 to S206 involve data reception.

In the association procedures, the STA 106 entering the area of a specific AP sends an association request message when it is in a power-up state; a reassociation request message when it is moved from another AP; or a disassociation request message when it disconnects the existing connection, in step S201. These request messages include the MAC address of the STA.

Upon receiving the (re)association or disassociation request message from the STA, the AP generates, maintains, or deletes a list of STAs in its area, in step S202.

In the data reception procedures, the CN 101 sends data to a specific STA as a destination, and the transferred data are first forwarded to the edge router 103 via the Internet network 102, in step S203. The IP address of the destination STA is known but the MAC address for final forwarding is unknown to the edge router 103. So, the edge router 103 broadcasts the data to the wireless LAN distribution system 104 so that the wireless LAN distribution system 104 forwards the data to all the APs 105-1 to 105-m, in step S204.

Upon receiving the data from the edge router 103, each AP performs a check for the IP address of the received frame and then an ARP to determine the destination MAC address, in step S205. Subsequently, the APs forward the data to the AP with the finally mapped MAC address as the destination, in step S206.

In this way, in the conventional wireless LAN distribution system, all the APs must perform an IP address check and an ARP for the packet sent to an STA not present in their area, because there is no location management for the STA in the distribution system. This problem may be solved in a network comprised of a small number of APs, but it causes unnecessary processing for each AP in a network with a substantial number of APs to thereby increase the processing load of the whole network, and consumes a relatively high processing power for the APs which raises the price of the APs.

Additional methods include one in which each AP in the wireless LAN distribution system may perform a proxy ARP in place of the STA belonging to its area, or a method in which the STA directly sends an ARP response to the ARP request of the edge router. In those cases, the ARP cache managed by the edge router becomes excessively large, and the traffic load of the whole network may explode because all the APs in the wireless LAN distribution system have to periodically perform an ARP or all the STAs in the wireless LAN distribution system have to make an ARP response.

Particularly, in an environment in which the STA is mobile, the mapping table at the edge router updated by a periodic ARP is possibly unmatched to the actual location of the STA, thus disabling the data-forwarding.

A related approach is Application No. 5768531 under with the title "Apparatus and methods for using multiple communication path in a wireless LAN" by Isabel Y. Lin, in which a specific STA is enabled to forward data directly to a destination STA belonging to the same AP, thereby reducing the traffic load of the wireless LAN distribution system. But this method also has a problem in that data forwarding is disabled in an environment in which the STA is mobile.

SUMMARY OF THE INVENTION

It is an advantage of the present invention to provide a location management server, an Ethernet-based wireless LAN distribution system having the location management server, and an embodiment method thereof that include a location management server for causing access points to perform an IP address check only for stations in their area in forwarding data received from a correspondent node, thereby reducing the processing power and traffic of the whole network.

It is another advantage of the present invention to provide a location management server, an Ethernet-based wireless LAN distribution system having the location management server, and an embodiment method thereof that enable an accurate determination of location for a plurality of stations having mobility and thereby allow the manufacture of access points at a low cost as well as the prevention of a failure in data forwarding.

In one aspect of the present invention, there is provided a wireless LAN distribution system, which forwards data received from a correspondent node to a station connected to an access point, the wireless LAN distribution system including: a location management server for storing and managing a mapping table as an information table storing IP (Internet Protocol) addresses of a plurality of stations and physical access control addresses of the access points having the stations located therein, and causing the access points to perform an IP address check only for the stations located in their area; an edge router for, upon receiving the data from the correspondent node via a communication network, forwarding the received data to the location management server using the physical access control address of the mapping table; and an access point for, upon receiving information on an access point having the destination station of the received data located therein from the location management server, checking the physical access control address of the access point and the IP address of the destination station, and forwarding the received data from the correspondent node.

In another aspect of the present invention, there is provided a location management server, which is for a wireless LAN distribution system for forwarding data received from a correspondent node to a station connected to an access point, the location management server including: a mapping table manager for, upon receiving a message related to association with the station from the access point, analyzing an IP address of a destination station and a physical access control address of an access point having the destination station located therein from the received association message, and managing the analyzed information with a mapping table as an information table; an IP address checker for checking the IP address of the destination station using the data forwarded from the correspondent node; and a MAC frame generator for, upon receiving information from the IP address checker and the mapping table manager, generating a forwarding physical access control frame destined for the access point having the destination station located therein.

In further another aspect of the present invention, there is provided an embodiment method for a wireless LAN distribution system, which is for forwarding data received from a correspondent node to a station connected to an access point, the method including: (a) upon receiving an association-related message from the station, the access point associating the station in its area according to the received association message; (b) checking an IP address of the station and a physical access control address of an access point having the station located therein from the association message including information on the associated station, and then managing a mapping table being an information table based on the checked addresses; (c) upon receiving data destined for a specific station from the correspondent node, checking the IP address of the received data using the mapping table; and (d) generating a physical access control frame based on the checked IP address, and forwarding the generated physical access control frame to the destination station.

In still further another aspect of the present invention, there is provided a programmed recording medium, which includes an embodiment method for a wireless LAN distribution system for forwarding data received from a correspondent node to a station connected to an access point, the recording medium having a built-in program including: (a) upon receiving an association-related message from the station, causing the access point to associate with the station in its area according to the received association message; (b) checking a physical access control address of an access point having the station located therein from the association message including information on the associated station, and then managing a mapping table being a table based on the check address; (c) upon receiving data destined for a specific station from the correspondent node, checking an IP address of the received data using the mapping table; and (d) generating a physical access control frame based on the checked IP address, and forwarding the generated physical access control frame to the destination station.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 5a and 5b illustrate the construction of a frame body message related to association in the Ethernet-based wireless LAN distribution system according to the embodiment of the present invention;

FIG. 9 illustrates the structure of a mapping table of the LMS of the Ethernet-based wireless LAN distribution system according to the embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
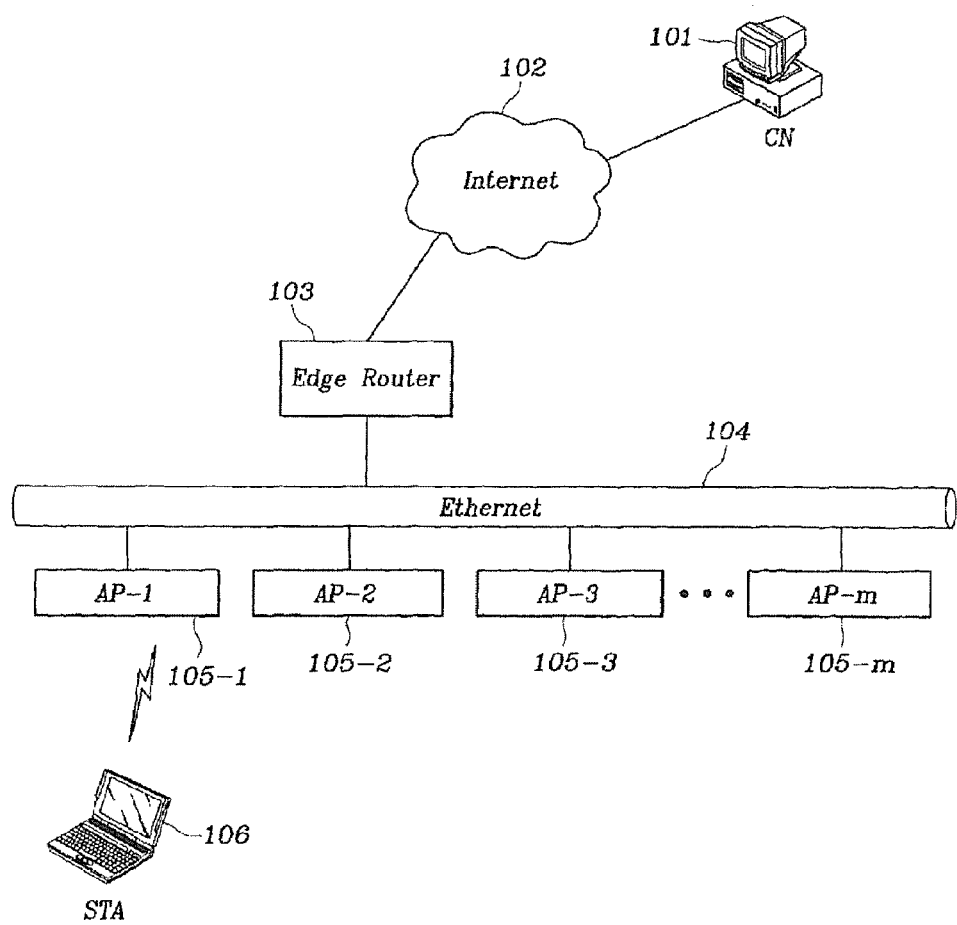
FIG. 1 is a schematic of an Ethernet-based wireless LAN distribution system according to prior art.
Figure 2:
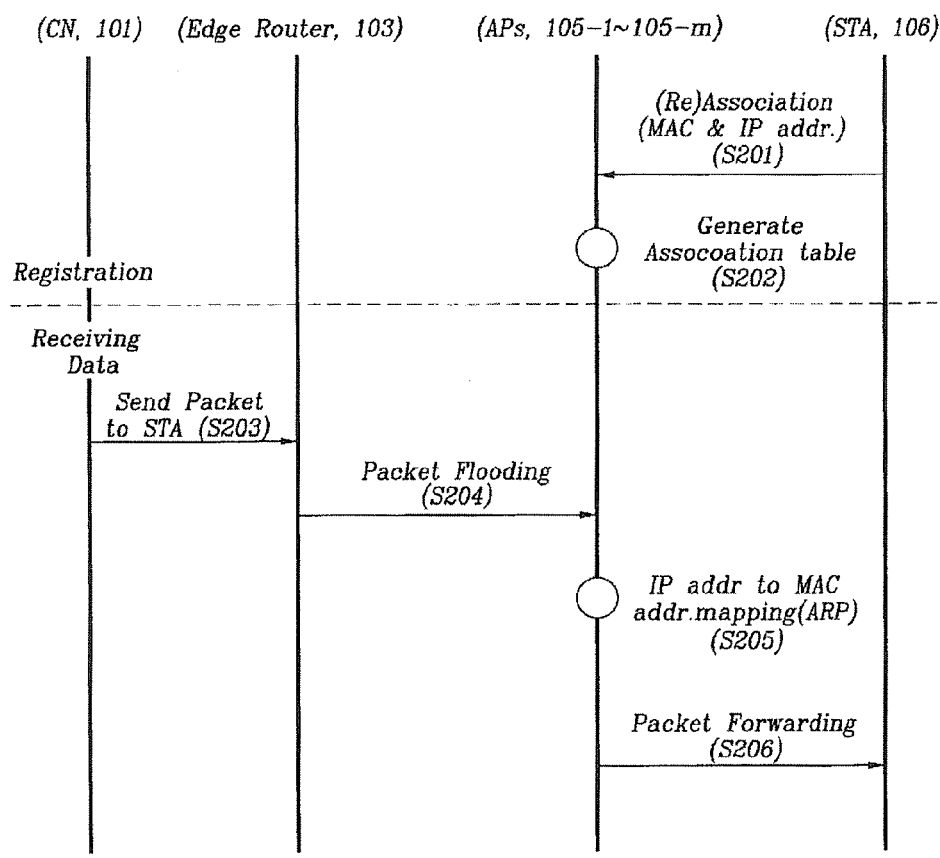
FIG. 2 is a timing diagram for association and data reception in the Ethernet-based wireless LAN distribution system according to prior art.
Figure 3:
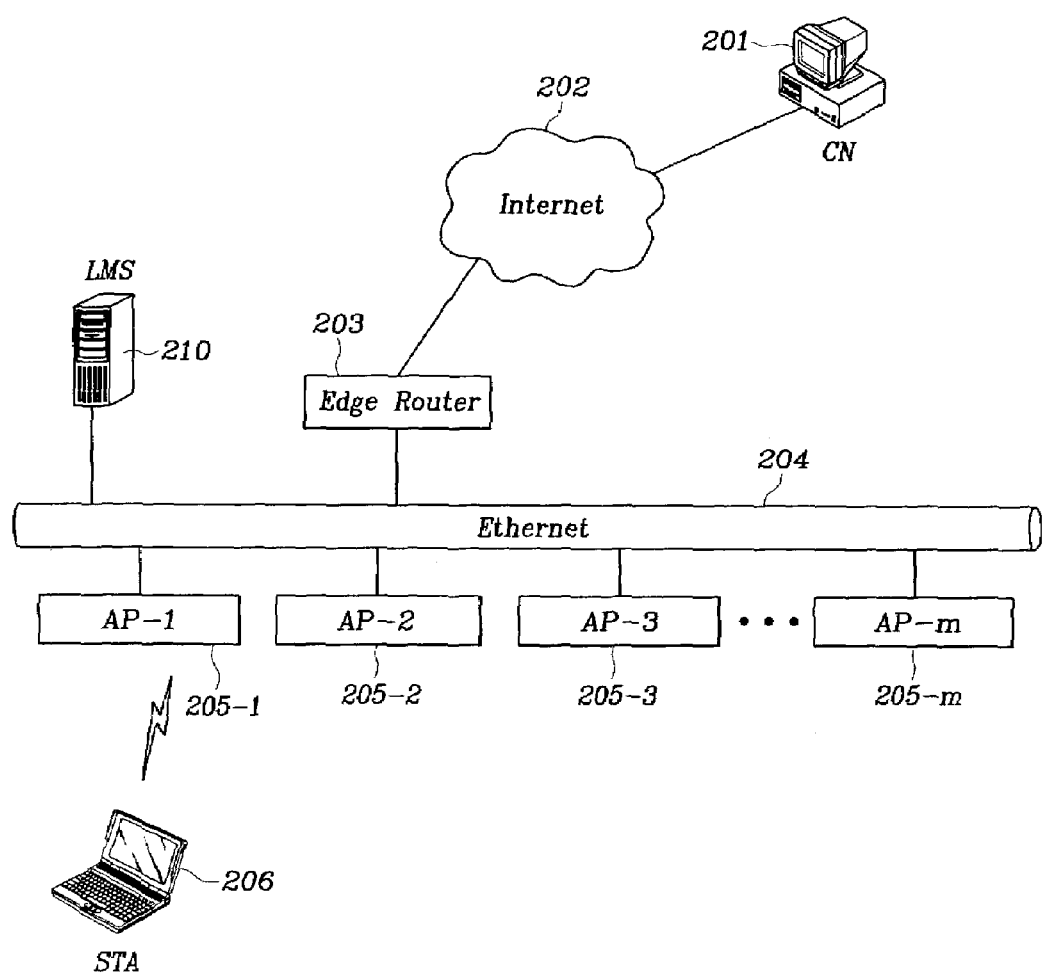
FIG. 3 is a schematic of an Ethernet-based wireless LAN distribution system according to an embodiment of the present invention.

FIG. 3 is a schematic of an Ethernet-based wireless LAN distribution system according to an embodiment of the present invention.

The wireless LAN distribution system according to the embodiment of the present invention comprises, as shown in FIG. 3, a LMS 210 for managing a list of a number of STAs.

More specifically, the wireless LAN distribution system comprises: a CN 201 connected to Internet network 202 for sending data to an STA 206; a public or private Internet network 202; an edge router 203 responsible for a subnet comprised of APs 205-1 to 205-m; a wireless LAN distribution system 204 operated according to the IEEE 802.3 standard; m APs 105-1 to 105-m each connected to the same wireless LAN distribution system 204; and an STA 206 receiving the data in the end.

The operation of the above-constructed wireless LAN distribution system will now be described as follows.

The data sent from the CN 201 to the destination STA are first forwarded to the edge router 203, to which the destination STA 206 belongs, via the Internet network using IP routing.

The edge router 203 simply forwards the received data to the LMS 210 using a predefined MAC address of the LMS 210. The LMS 210 searches for an AP having the destination STA located therein with reference to its list, and forwards the data to the MAC address of the AP.

The AP checks the destination IP address of the forwarded data, performs an ARP to search for the MAC address of the IP address, and finally sends this to the STA.

In this manner, the wireless LAN distribution system according to the embodiment of the present invention has the LMS 210 that enables the APs to check the IP address of the STA only in its area, thus reducing the processing power and traffic of the whole network.

Now, a description will be given in detail as to a process for data reception and association using the wireless LAN distribution system with reference to the accompanying drawing.

Figure 4:
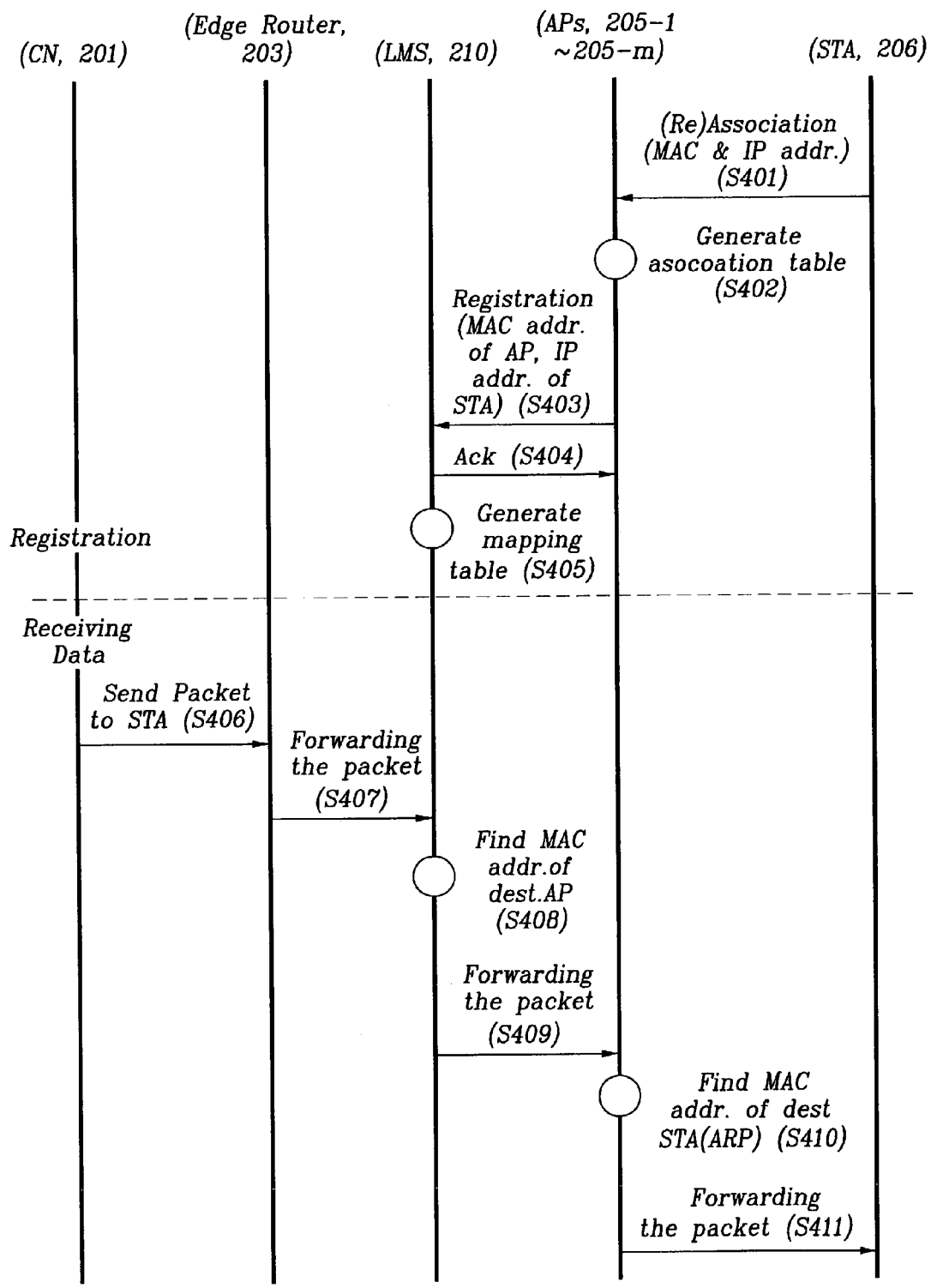
FIG. 4 is a timing diagram of the Ethernet-based wireless LAN distribution system according to the embodiment of the present invention.

FIG. 4 is a timing diagram of the association and data reception of the wireless LAN distribution system according to the embodiment of the present invention, in which the steps S401 and S405 involve an association of the STA in the wireless LAN distribution system, and the steps S406 to S4011 involve data reception.

In the association procedures, the STA entering the area of a specific AP sends an association request message when it is in a power-up state; a reassociation request message when it is moved from another AP; or a disassociation request message when it disconnects the existing connection, in step S401. These request messages include the IP address of the STA in addition to the MAC address of the STA.

Upon receiving the (re)association or disassociation request message from the STA, the AP generates, maintains, or deletes a list of STAs in its area, in step S402. The AP sends information on its MAC address and the IP address of the newly associated STA to the LMS 210 through the association message, in step S403.

Upon receiving the association message including the information, the LMS 210 sends an acknowledgement (Ack) message to the AP to confirm the association, in step S404. If not receiving the Ack message from the LMS 210, the AP resends association information after a predetermined time.

The LMS 210 manages a list of the IP addresses of multiple STAs in the area of each AP, in step S405.

In the data reception procedures, the CN 201 sends data to a specific STA as a destination, and the data are first fed into the edge router 203 via the Internet network 202, in step S406.

The edge router 206 just forwards the received data to the LMS 210 from the MAC layer without any manipulation, in step S407. The LMS 210 checks the IP address of the forwarded data and uses the mapping table maintained/managed by itself to determine the AP area to which the destination STA belongs, in step S408.

The LMS 210 generates a new MAC frame destined for the MAC address of the determined AP and forwards the data to the corresponding AP, in step S409. Upon receiving the data from the LMS 210, the AP checks the IP address of the received frame and performs mapping with the MAC address of the destination STA through an ARP, in step S410.

Then the AP forwards the data to the destination STA with the mapped MAC address, in step S411.

The frame body format of the association message sent in the STA association step (S401) will now be described as follows, with reference to the accompanying drawings.

FIGS. 5a and 5b illustrate the construction of a frame body format of the (re)association message in the Ethernet-based wireless LAN distribution system according to the embodiment of the present invention: FIG. 5a is the frame body format of the association message, and FIG. 5b is the frame body format of the reassociation message.

The frame body of the (re)association message is, as shown in the figures, the same as that of the conventional 802.11 (re)association message except for the IP address part at the tailing part. Namely, the IP address of the frame body represents the IP address of the STA, and the reason why the IP address is added at the tailing part of the frame body is because the reassociation message of the embodiment of the present invention provides the IP address of the STA.

The LMS according to the embodiment of the present invention will now be described in detail with reference to the accompanying drawings.

Figure 6:
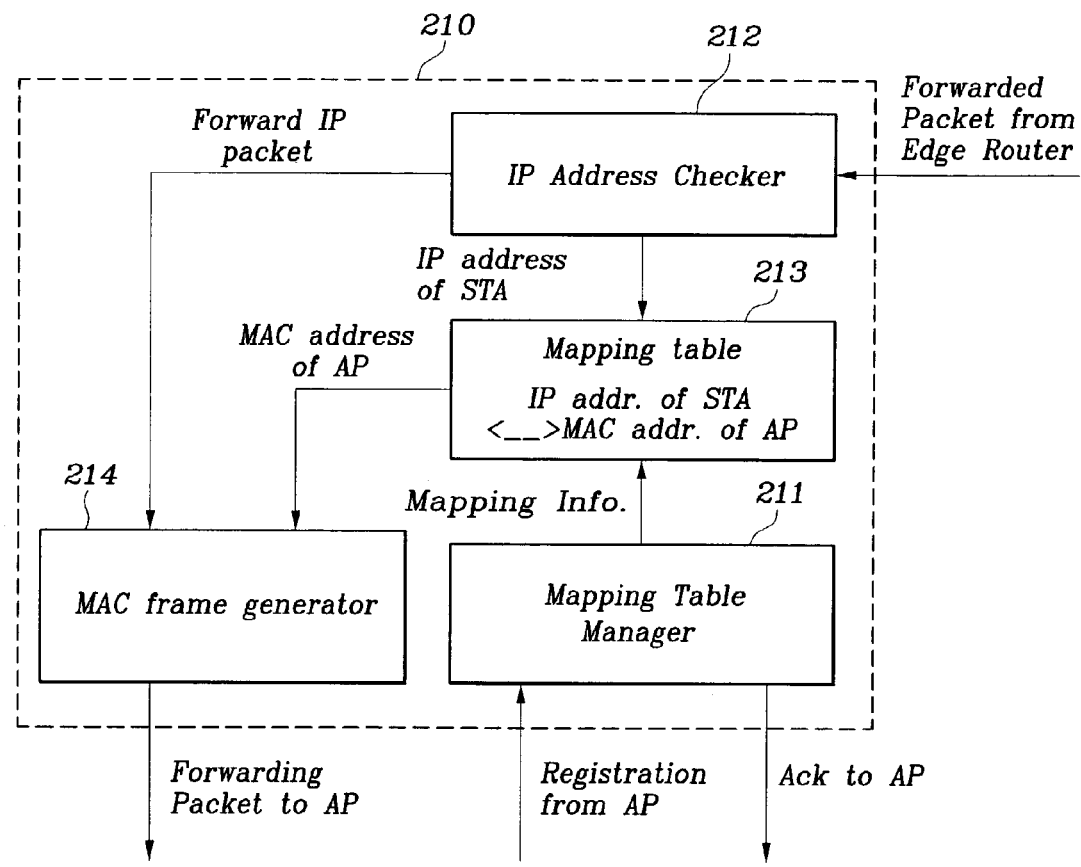
FIG. 6 illustrates the internal construction of the LMS of the Ethernet-based wireless LAN distribution system according to the embodiment of the present invention.

FIG. 6 illustrates the internal construction of the LMS according to the embodiment of the present invention. Although the indispensable components of the LMS are described in this embodiment, the present invention is not specifically limited and may include components of other functions. The LMS can also be embodied as an edge router.

The LMS 210 according to the embodiment of the present invention comprises, as shown in FIG. 6, a mapping table manager 211, an IP address checker 212, a mapping table 213, and a MAC frame generator 214.

More specifically, the mapping table manager 211 receives the association message forwarded from the AP and manages a mapping table for the IP address of the destination STA and the MAC address of an AP having the destination STA located therein. For reference, the mapping table 213 is an information table presenting the IP address of the destination STA and the MAC address of the AP having the destination STA located therein as managed through the mapping table manager 211.

The IP address checker 212 checks the IP address of the destination STA for the packet forwarded from the edge router 203.

The MAC frame generator 214 receives the forwarded IP packet from the IP address checker 212 and the MAC address of the AP having the destination STA located therein from the mapping table 213, and generates a forwarding MAC frame destined for the AP having the destination STA located therein.

The operation of the LMS will be described in detail with reference to FIG. 7 as follows.

Figure 7:
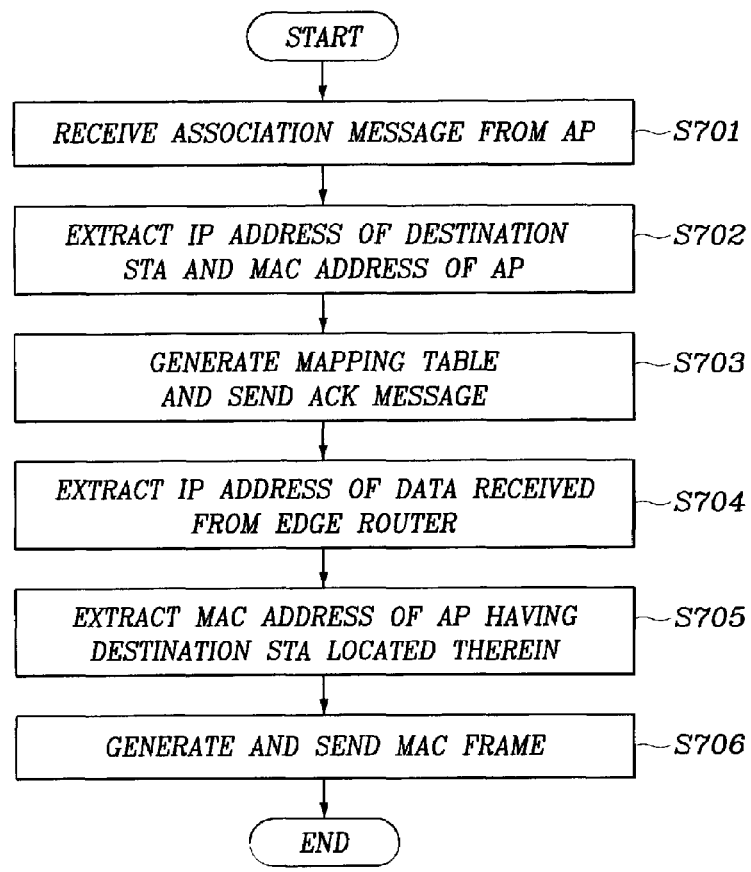
FIG. 7 is a flow chart sequentially showing an operation of the LMS shown in FIG. 6.

FIG. 7 is a flow chart showing the sequential operation of the LMS according to the embodiment of the present invention.

First, the mapping table manager 211 extracts the IP address of the destination STA and the MAC address of an AP having the destination STA located therein using the association message received (in step S701) from the AP, in step S702, and forwards the extracted information to the mapping table 213.

The mapping table manager 211 generates a mapping table for the corresponding STA and then an Ack message for reception of the mapping information, and sends the generated Ack message to the corresponding AP, in step S703.

The IP address checker 212 removes the MAC frame from the forwarding data received from the edge router 203, extracts an IP header, and searches for the IP address of the destination STA, in step S704, and outputs the information to the mapping table 213.

The IP address checker 212 sends the extracted IP packet to the MAC frame generator 214. The mapping table 213 searches for the MAC address of the AP having the STA located therein using the IP address of the STA received from the IP address checker 212 under the control of the mapping table manager 211, in step S705, and outputs the MAC address to the MAC frame generator 214.

The MAC frame generator 214 generates a MAC frame destined for the AP having the destination station located therein using the forwarded IP packet received from the IP address checker 212 and the MAC address of the AP received from the mapping table 213, and sends the generated MAC frame to the wireless LAN distribution system 204, in step S706.

Now, a description will be given as to the association message received (in step S701) from the AP with reference to the accompanying drawings.

Figure 8:
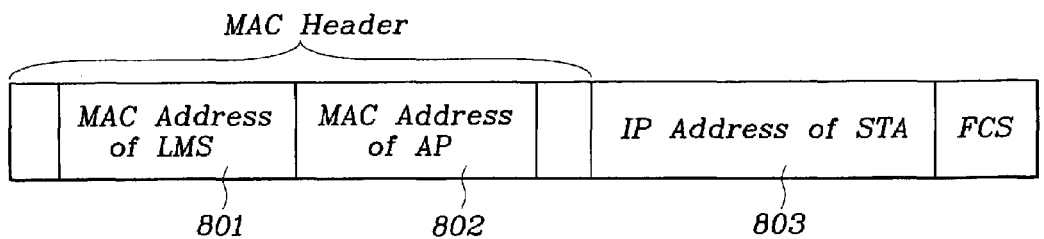
FIG. 8 illustrates an association message of the Ethernet-based wireless LAN distribution system according to the embodiment of the present invention.

FIG. 8 illustrates the packet format of the association message sent from the AP to the LMS according to the embodiment of the present invention.

A general IEEE 802.3 MAC frame is used for the association message, which provides MAC address 802 of the AP to the transmitter and MAC address 801 of the LMS 210 to the receiver. IP address 803 of the STA is included in the payload part of the MAC frame. In the other part, the association message is the same as in the general MAC frame.

Next, a mapping table managed by the LMS will be described in detail with reference to FIG. 9.

FIG. 9 illustrates a mapping table managed by the LMS according to the embodiment of the present invention, in which the left-hand part 910 of the mapping table records the MAC address of each AP, and the right-hand part 920 records the IP address of each STA in the AP.

MAC_addr_AP_1 911 represents that the AP having the MAC address manages "a" STAs IP_Addr_STA_11 to IP_Addr_STA_1a 921; MAC_addr_AP_2 912 represents that the AP having the MAC address "b" STAs IP_Addr_STA_21 to IP_Addr_STA_2b 922; and MAC_addr_AP—K—913 represents that the AP having the MAC address manages "c" STAs IP_Addr_STA_k1 to IP_Addr_STA_kc.

Upon receiving the packet from the edge router 203, the LMS 210 extracts an IP packet header from the received packet to check the IP address, and generates a MAC frame destined for the MAC address of the corresponding AP according to the mapping table of FIG. 9.

Now, a description will be given in detail as to a protocol stack in forwarding data from the CN 201 to the destination STA with reference to FIG. 10.

Figure 10:
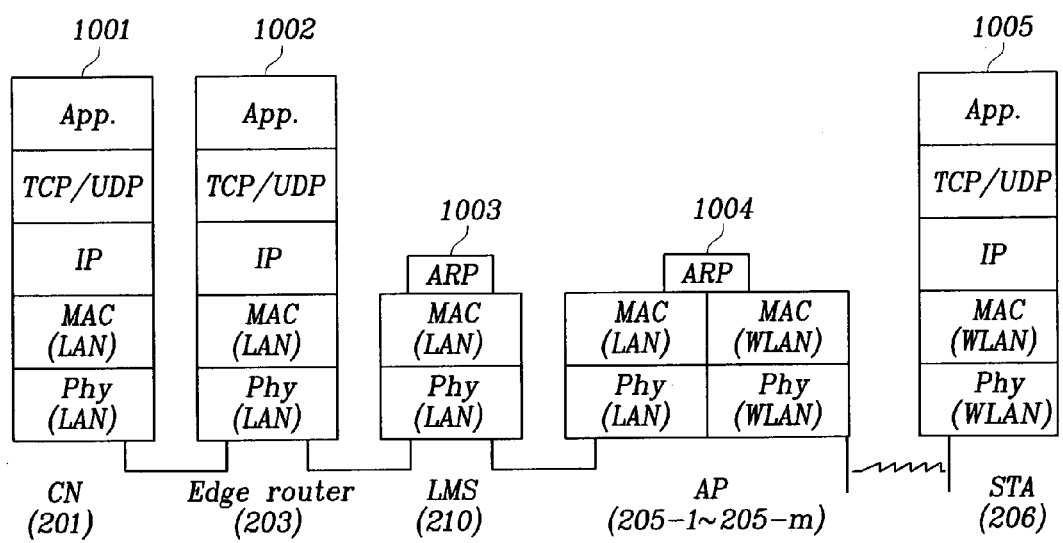
FIG. 10 illustrates a protocol stack in forwarding data from a CN to a destination STA according to the embodiment of the present invention.

FIG. 10 illustrates the structure of a protocol stack in forwarding data from a CN to a destination STA according to the embodiment of the present invention, Referring to FIG. 10, a protocol stack 1001 of the CN 201, a protocol stack 1002 of the edge router 203, a protocol stack 1003 of the LMS 210, a protocol stack 1004 of the APs 205-1 to 205-m, and a protocol stack 1005 of the STA 206 are illustrated. Between the CN 201 and the edge router 203, between the edge router 203 and the LMS 210, and between the LMS 210 and the APs 205-1 to 205-m are wire connections. Only between the APs 205-1 to 205-m and the STA 206 are there wireless connections.

More specifically, the protocol stack 1001 of the CN 201 is a protocol stack from the terminal, and it has a complete protocol stack structure from the lower physical layer PHY to the uppermost application layer App. Data forwarding to the edge router 203 is achieved with the protocol stack 1002 to the network layer.

The LMS 210 additionally has an ARP stack, which is used for searching for the address of the AP having the destination STA located therein. Here, the ARP is not a specific protocol but an address mapping protocol of a general concept for mapping the IP address with the MAC address.

The protocol stack 1004 of the AP having the destination STA located therein includes the MAC of a wire LAN, a PHY stack and the MAC of a wireless LAN, and a PHY protocol stack so as to convert a wire LAN frame to a wireless LAN frame. An ARP stack is additionally provided in the upper part of the protocol stack so as to search for the final MAC address of the destination STA.

As in the LMS 210, the ARP is not a specific protocol but may be an address mapping protocol of a general concept for mapping the IP address with the MAC address.

The protocol stack of the destination STA is the same as the protocol stack of the CN 201 with the exception that it has a wireless LAN MAC and a PHY protocol stack. The protocol stack of the destination STA maintains connection between the CN 201 and the edge router.

Figure 11:
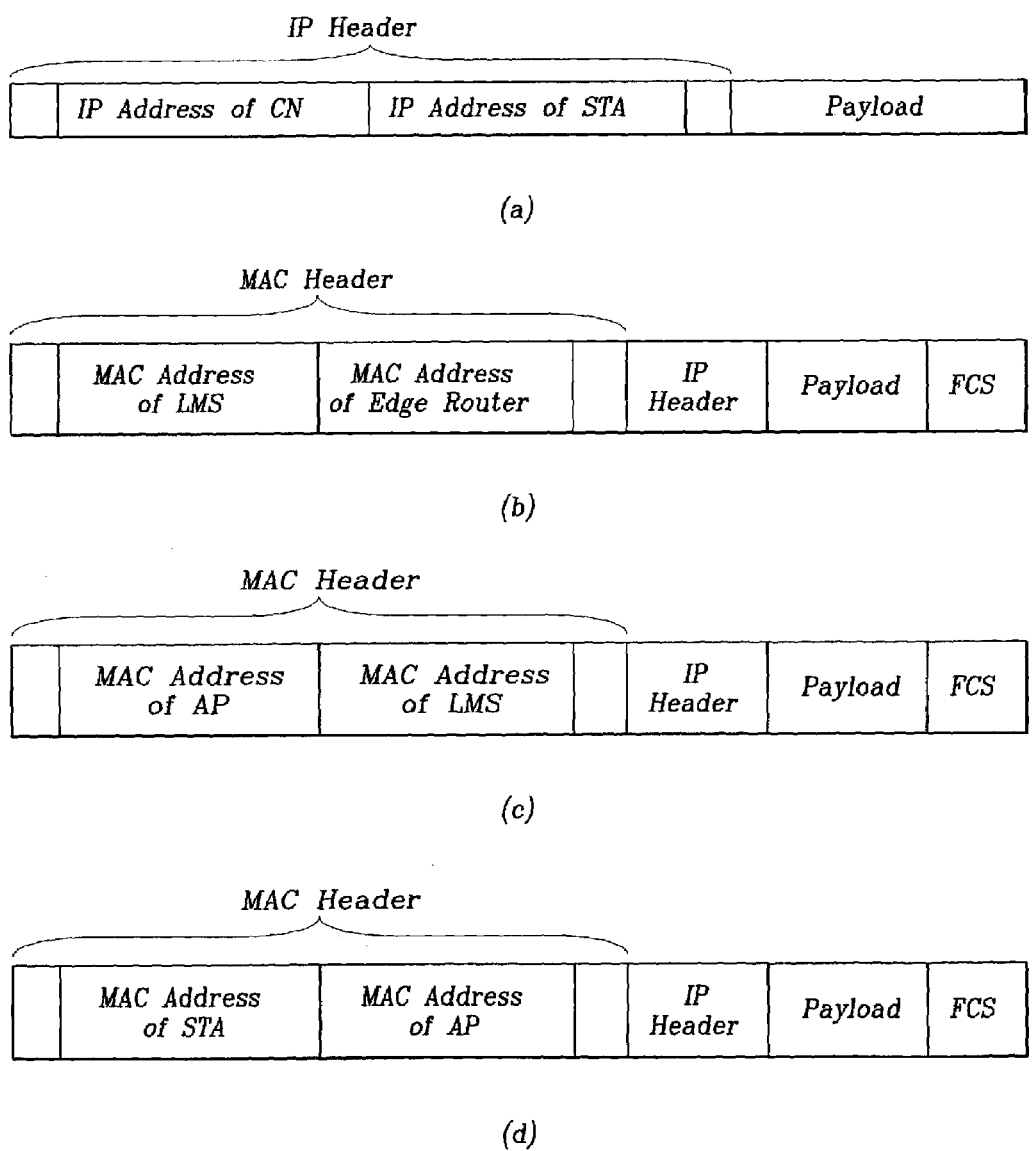
FIGS. 11a to 11d illustrate packet formats in the individual interfaces according to the embodiment of the present invention.

Now, the packet formats in the individual interfaces will be described in brief with reference to FIG. 11.

FIGS. 11*a* to 11*d* illustrate packet formats in the individual interfaces according to the embodiment of the present invention.

More specifically, FIG. 11*a* shows a packet format from the CN to the edge router for an IP packet transferred by an IP routing. The destination address is the IP address of the STA, and the transmitter address is the address of the CN. The parts other than the address part are the same as those of a general IP packet.

FIG. 11*b* shows a packet format from the edge router to the LMS for a MAC frame transferred according to the IEEE 802.3 CSMA/CD protocol. The destination address is the MAC address of the LMS, and the transmitter address is the MAC address of the edge router. The parts other than the address part are the same as those of a general MAC frame.

FIG. 11C shows a packet format from the LMS to the AP for a MAC frame transferred according to the IEEE 802.3 CSMA/CD protocol. The destination address is the MAC address of an AP having the destination STA located therein, and the transmitter address is the address of the LMS. The parts other than the address part are the same as those of the general MAC frame.

FIG. 11d shows a packet format from the AP to the STA for a MAC frame transferred according to the IEEE 802.11 CSMA/CD protocol. The destination address is the MAC address of the destination STA, and the transmitter address is the address of the AP having the destination STA located therein. The parts other than the address part are the same as those of the general MAC frame.

In this manner, the location management server, the Ethernet-based wireless LAN distribution system having the location management server, and the embodiment method thereof according to the present invention include the location management server for causing access points to perform an IP address check only for the stations in their area, thereby reducing the processing power and traffic of the whole network.

Furthermore, the present invention enables an accurate determination of location for a plurality of stations having mobility so as to allow the manufacture of access points at a low cost as well as the prevention of a failure in data forwarding.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the location management server, the Ethernet-based wireless LAN distribution system having the location management server, and the embodiment method thereof according to the present invention include the location management server that enables access points to perform an IP address check only for the stations in their area, thereby reducing the processing power and traffic of the whole network; and they accurately determine the location of a plurality of stations having mobility so as to allow the manufacture of access points at a low cost as well as the prevention of a failure in data forwarding.

What is claimed is:

1. A wireless LAN (Local Access Network) distribution system, which forwards data received from a correspondent node to a destination station among a plurality of stations respectively connected to a plurality of access points, the wireless LAN distribution system comprising:

a location management server for storing and managing a mapping table as an information table storing IP (Internet Protocol) addresses of the plurality of stations and physical access control addresses of the plurality of access points having the stations located therein, the location management server to identify an access point connected to the destination station to cause only the identified access point, from the plurality of access points, to perform an IP address check of the stations located in the area of the identified access point; and an edge router for, upon receiving the data from the correspondent node via a communication network, forwarding the received data to the location management server, wherein the location management server identifies the access point connected to the destination station, among the plurality of access points, by checking the IP address of the destination station in the information table, forwards the received data to the identified access point by using the IP address of the destination station and the physical access address of the identified access point, such that the identified access point forwards the received data to the destination station by using the IP address of the destination station;

generates an acknowledgment (Ack) message in response to receiving association information of the identified access point subsequent to updating the information table with the association information regarding a station within the area of the identified access point, and sends the generated Ack message to the identified access point; and the location management server including a MAC (Media Access Control) frame generator for generating a MAC frame destined for the identified access point having the destination station located therein.

2. The wireless LAN distribution system as claimed in claim 1, wherein upon receiving an association-related message from the destination station, each of the plurality of access points associates the destination station in its area according to a received association message, and sends information on the associated destination station to the location management server.

3. The wireless LAN distribution system as claimed in claim 2, wherein the received association message includes the IP address of the destination station.

4. The wireless LAN distribution system as claimed in claim 1, wherein the location management server comprises:

a mapping table manager for, upon receiving an association message from the access point, analyzing the IP address of the destination station and the MAC address of an access point having the destination station located therein from the received association message, and managing analyzed information using the mapping table as an information table; and an IP address checker for checking the IP address of the destination station using the data forwarded from the edge router, the MAC (Media Access Control) frame generator for, upon receiving information from the IP address checker and the mapping table manager, generating the MAC frame destined for the access point having the destination station located therein according to the received information.

5. The wireless LAN distribution system as claimed in claim 4, wherein the location management server checks the MAC address of the access point having the destination station positioned therein using an ARP (Address Resolution Protocol) stack as an address mapping protocol.

6. The wireless LAN distribution system as claimed in claim 4, wherein the MAC frame generator generates the MAC frame using a packet related to the IP address of the destination station received from the IP address checker, and the MAC address of the access point input from the mapping table under the control of the mapping table manager.

7. The wireless LAN distribution system as claimed in claim 4, wherein the received association message includes information on the destination stations associated with the access point, the MAC address of the access point, and information on the IP address of the associated destination stations.

8. The wireless LAN distribution system as claimed in claim 1, wherein the system conforms to the IEEE 802.3 standard in forwarding data received from the correspondent node to the destination station connected to the access point.

9. A location management server, which is for a wireless LAN distribution system for forwarding data received from an edge router of a correspondent node to a destination station among a plurality of stations respectively connected to a plurality of access points, the location management server comprising:
- a mapping table manager for, upon receiving an association message from an access point, analyzing an IP address of the destination station and a MEDIA access control (MAC) address of the access point having the station located therein from a received association message, managing analyzed information through a mapping table as an information table, and generating an acknowledgment (Ack) message in response to the received association message, and sending the generated Ack message to the access point;
- an IP address checker for checking the IP address of the destination station using the data forwarded from the outer router of the correspondent node to search the MAC address to identify an access point connected to the destination station among the plurality of access points; and
- a MAC frame generator for, upon receiving information from the IP address checker and the mapping table manager, generating a MAC frame destined for the identified access point having the destination station located therein by using the IP address of the destination station and the searched MAC address, and outputting the MAC frame to cause only the identified access point, from the plurality of access points, to perform an IP address check of the stations located in the area of the identified access point.

10. A method for a wireless LAN distribution system, which is for forwarding data received from an edge router of a correspondent node to a station connected to an access point, the method comprising:
- (a) upon receiving an association-related message from the station, the access point associating the station in its area according to a received association message;
- (b) checking an IP address of the station and a media access control (MAC) address of an access point having the station located therein from the association message including information on the associated station, then managing a mapping table being an information table based on the checked addresses, and sending an acknowledgement signal for the received association message to the access point;
- (c) upon receiving data destined for a specific station from the edge router of the correspondent node, checking the IP address of the received data using the mapping table to search the MAC address of an access point identified having the specific station located therein, and to cause only the identified access point, from a plurality of access points, to perform an IP address check of the stations located in the area of the identified access point by checking the IP address of the destination station in the only access point; and
- (d) generating a MAC frame based on only the IP address and the searched MAC address, and forwarding the generated physical access control frame to the destination station via only the access point using a computer.

11. The method as claimed in claim 10, wherein (a) comprises:
- receiving an association request message from the station, when the station enters a specific access point;
- receiving a reassociation request message from the station, when the station moves to another access point; and
- receiving a disassociation request message from the station, when the station intends to cancel the existing association.

12. The method as claimed in claim 10, wherein (c) comprises:
- searching for the access point having the destination station located therein, the destination station being to receive the data from the correspondent node; and
- checking the MAC address of the searched access point.

13. The method as claimed in claim 12, wherein (c) comprises:
- checking the MAC address of the access point having the destination station located therein using an ARP stack being an address mapping protocol.

14. The method as claimed in claim 10, wherein (d) comprises:
- checking the IP address of the generated MAC frame;
- mapping the checked address with the MAC address of the destination station; and
- forwarding the data received from the correspondent node to the destination station according to the mapped MAC address.

* * * * *